United States Patent
Harter

(10) Patent No.: US 11,394,577 B2
(45) Date of Patent: Jul. 19, 2022

(54) EXPANDABLE NETWORK DEVICE

(71) Applicant: Charter Communications Operating, LLC, St. Louis, MO (US)

(72) Inventor: Ryan Matthew Harter, Castle Rock, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 101 days.

(21) Appl. No.: 16/745,196

(22) Filed: Jan. 16, 2020

(65) Prior Publication Data

US 2021/0227029 A1  Jul. 22, 2021

(51) Int. Cl.
| | |
|---|---|
| H04L 12/28 | (2006.01) |
| H04L 61/5014 | (2022.01) |
| H04L 67/1097 | (2022.01) |
| H04L 12/46 | (2006.01) |
| H04L 41/0806 | (2022.01) |
| G06F 13/40 | (2006.01) |
| G06F 13/38 | (2006.01) |

(Continued)

(52) U.S. Cl.
CPC ...... *H04L 12/2856* (2013.01); *G06F 12/0866* (2013.01); *G06F 12/1081* (2013.01); *G06F 13/382* (2013.01); *G06F 13/4045* (2013.01); *H04L 12/4641* (2013.01); *H04L 41/0806* (2013.01); *H04L 61/2015* (2013.01); *H04L 67/1097* (2013.01)

(58) Field of Classification Search
CPC ............. H04L 12/2856; H04L 61/2015; H04L 67/1097; H04L 12/4641; H04L 41/0806; H04L 41/08; G06F 12/1081; G06F 12/0866; G06F 13/4045; G06F 13/382
See application file for complete search history.

(56) References Cited

U.S. PATENT DOCUMENTS

| | | | |
|---|---|---|---|
| 5,649,001 A | * | 7/1997 | Thomas ............... H04L 29/06 379/93.07 |
| 7,409,478 B2 | * | 8/2008 | Kreiner ............... G06F 13/385 710/305 |
| 7,792,963 B2 | | 9/2010 | Gould et al. |

(Continued)

OTHER PUBLICATIONS

Wikimedia Foundation. (Jun. 21, 2021). Dynamic Multipoint Virtual Private Network. Wikipedia. Retrieved Feb. 22, 2022, from https://en.wikipedia.org/wiki/Dynamic_Multipoint_Virtual_Private_Network.

(Continued)

*Primary Examiner* — Ramy M Osman
(74) *Attorney, Agent, or Firm* — Otterstedt & Kammer PLLC

(57) ABSTRACT

Methods, apparatus, and systems for incorporating a dynamic interface into an expandable network device. A section of memory of the expandable network device is partitioned for the dynamic interface and the dynamic interface is loaded into the partitioned section of the memory. A hardware interface of the expandable network device is configured to communicate with the dynamic interface under a control of the dynamic interface; and a communication channel is established between a network interface of the expandable network device and the hardware interface of the expandable network device via the dynamic interface.

20 Claims, 14 Drawing Sheets

(51) Int. Cl.
  *G06F 12/1081*  (2016.01)
  *G06F 12/0866*  (2016.01)

(56) References Cited

U.S. PATENT DOCUMENTS

| | | | |
|---|---|---|---|
| 2003/0056217 A1 | 3/2003 | Brooks | |
| 2005/0278521 A1* | 12/2005 | Hirai | G06F 9/4411 713/1 |
| 2006/0130107 A1 | 6/2006 | Gonder et al. | |
| 2007/0109975 A1* | 5/2007 | Reckamp | H04L 12/2814 370/254 |
| 2007/0217436 A1 | 9/2007 | Markley et al. | |
| 2009/0248794 A1 | 10/2009 | Helms et al. | |
| 2010/0313236 A1 | 12/2010 | Straub | |
| 2012/0047576 A1* | 2/2012 | Do | G06F 21/85 726/22 |
| 2013/0091310 A1* | 4/2013 | Caballero | G06F 13/102 710/62 |
| 2016/0180100 A1* | 6/2016 | Britt | H04L 67/306 726/27 |
| 2018/0048716 A1* | 2/2018 | Madhayyan | H04L 61/2015 |
| 2018/0295017 A1* | 10/2018 | Mao | H04L 41/0816 |
| 2019/0371132 A1* | 12/2019 | Hecker | G06Q 30/06 |
| 2020/0076685 A1* | 3/2020 | Vaidya | H04L 41/0886 |
| 2021/0218634 A1* | 7/2021 | Harter | H04L 45/74 |
| 2021/0227029 A1* | 7/2021 | Harter | H04L 41/0806 |

OTHER PUBLICATIONS

RDK-B architecture. RDK Central Wiki. (n.d.). Retrieved Feb. 22, 2022, from https://wiki.rdkcentral.com/display/RDK/RDK-B+Architecture.

Dynamic Multipoint VPN (DMVPN). Dynamic Multipoint VPN (DMVPN)—PacketLife.net. (n.d.). Retrieved Feb. 22, 2022, from https://packetlife.net/blog/2008/jul/23/dynamic-multipoint-vpn-dmvpn/.

Dynamic vpns with pulse secure clients. Dynamic VPNs with Pulse Secure Clients | Junos OS | Juniper Networks, (n.d.). Retrieved Feb. 22, 2022, from https://www.juniper.net/documentation/en_US/junos/topics/topic-map/security-dynamic-vpns-with-pulse-secure-clients.html.

Sans, .tdb-post-meta{margin-bottom:16px;color:#444;font-family:open, Semperboni, F., By, Semperboni, F., here, N. P. enter your name, & here, P. enter your name. (Dec. 11 2020). Understanding CISCO DMVPN. CiscoZine. Retrieved Feb. 22, 2022, from https://www.ciscozine.com/understanding-cisco-dmvpn/.

Wikimedia Foundation. (Feb. 15, 2022). IEEE 802.15.4. Wikipedia. Retrieved Feb. 23, 2022, from https://en.wikipedia.org/wiki/IEEE_802.15.4.

Wikimedia Foundation (Jan. 25, 2022). IEEE 802.11 Wikipedia. Retrieved Feb. 23, 2022, from https://en.wikipedia.org/wiki/IEEE_802.11.

Wikimedia Foundation. (Jan. 17, 2022). IEEE 802.15. Wikipedia. Retrieved Feb. 23, 2022, from https://en.wikipedia.org/wiki/IEEE_802.15.

RFC 4555—ikev2 mobility and Multihoming Protocol (Mobike). Document search and retrieval page. (n.d.). Retrieved Feb. 23, 2022, from https://datatracker.ietf.org/doc/html/rfc4555.

RFC 5265—mobile IPv4 traversal across IPsec-based VPN Gateways. Document search and retrieval page. (n.d). Retrieved Feb. 23, 2022, from https://datatracker.ietf.org/doc/html/draft-ietf-mip4-vpn-problem-solution.

* cited by examiner

US 11,394,577 B2

EXPANDABLE NETWORK DEVICE

FIELD OF THE INVENTION

The present invention relates generally to the electrical, electronic, and computer arts, and more particularly relates to network devices, the Internet of Things (IoT), and the like.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville, Colo. 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Provisioning, within a broadband network, includes the process of ensuring that customer premises equipment (CPE) such as cable modems, digital subscriber line (DSL) modems, and the like are properly configured, authenticated, and successfully come online.

A variety of network-interfaced devices, such as laptop computers, smartphones, Internet of Things (IoT) devices (including web cameras and thermostats), and the like, can access networks, such as the Internet, via the CPE. Many of the devices, especially those in the IoT category, utilize proprietary hubs to interface an IoT device to the Internet via, for example, a CPE. This leads to a potentially unmanageable number of hardware devices, such as proprietary hubs, within the network, and increases costs with respect to the potentially redundant hardware devices.

SUMMARY OF THE INVENTION

Techniques are provided for an Expandable Network Device ("END"), which, in one or more embodiments, is capable of interfacing with a plurality of different types of network-interfaced devices.

In one aspect, an exemplary method includes the operations of partitioning a section of memory of the expandable network device for the dynamic interface; loading the dynamic interface into the partitioned section of the memory; configuring a hardware interface of the expandable network device to communicate with the dynamic interface under a control of the dynamic interface; and establishing a communication channel between a network interface of the expandable network device and the hardware interface of the expandable network device via the dynamic interface.

In one aspect, an expandable network device comprises a memory; and at least one processor coupled to said memory; wherein said expandable network device is configured to perform operations comprising partitioning a section of memory of the expandable network device for the dynamic interface; loading the dynamic interface into the partitioned section of the memory; configuring a hardware interface of the expandable network device to communicate with the dynamic interface under a control of the dynamic interface; and establishing a communication channel between a network interface of the expandable network device and the hardware interface of the expandable network device via the dynamic interface.

In one aspect, a non-transitory computer readable medium comprises computer executable instructions which when executed by a computer cause the computer to perform operations comprising partitioning a section of memory of the expandable network device for the dynamic interface; loading the dynamic interface into the partitioned section of the memory; configuring a hardware interface of the expandable network device to communicate with the dynamic interface under a control of the dynamic interface; and establishing a communication channel between a network interface of the expandable network device and the hardware interface of the expandable network device via the dynamic interface.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., an expandable network device) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

expansion of network devices, such as network routers, to dynamically incorporate third-party software interfaces;

all-in-one functionality for IoT/Smart Home connected devices where a single device provides layer 2 and 3 functionality for different types of devices;

elimination of the need for third-party layer 2 (Zigbee, z-wave, and the like) and layer 3 (Wi-Fi and the like) hardware to control and/or communicate with IoT/Smart Home connected devices;

an open source platform on a router or other network device for enabling manufacturers of IoT products to install applications via a multi-service operator application center, or directly onto the expandable network device for establishing communications with and/or controlling IoT/Smart Home connected devices and the like;

elimination of the need for cabled solutions for interfacing to IoT/Smart Home devices and the like;

a secure ecosystem/network between a user and IoT/Smart Home devices for providing secure remote access to devices from outside of the home or other environment;

expansion capability for incorporating an internal or expandable storage device for applications such as storage of security camera video, relaying of content to a cloud-based service, and the like; and remote user access to IoT/Smart Home devices and the like via cloud-based services (including third-party services) and/or services using a form of encrypted technology.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
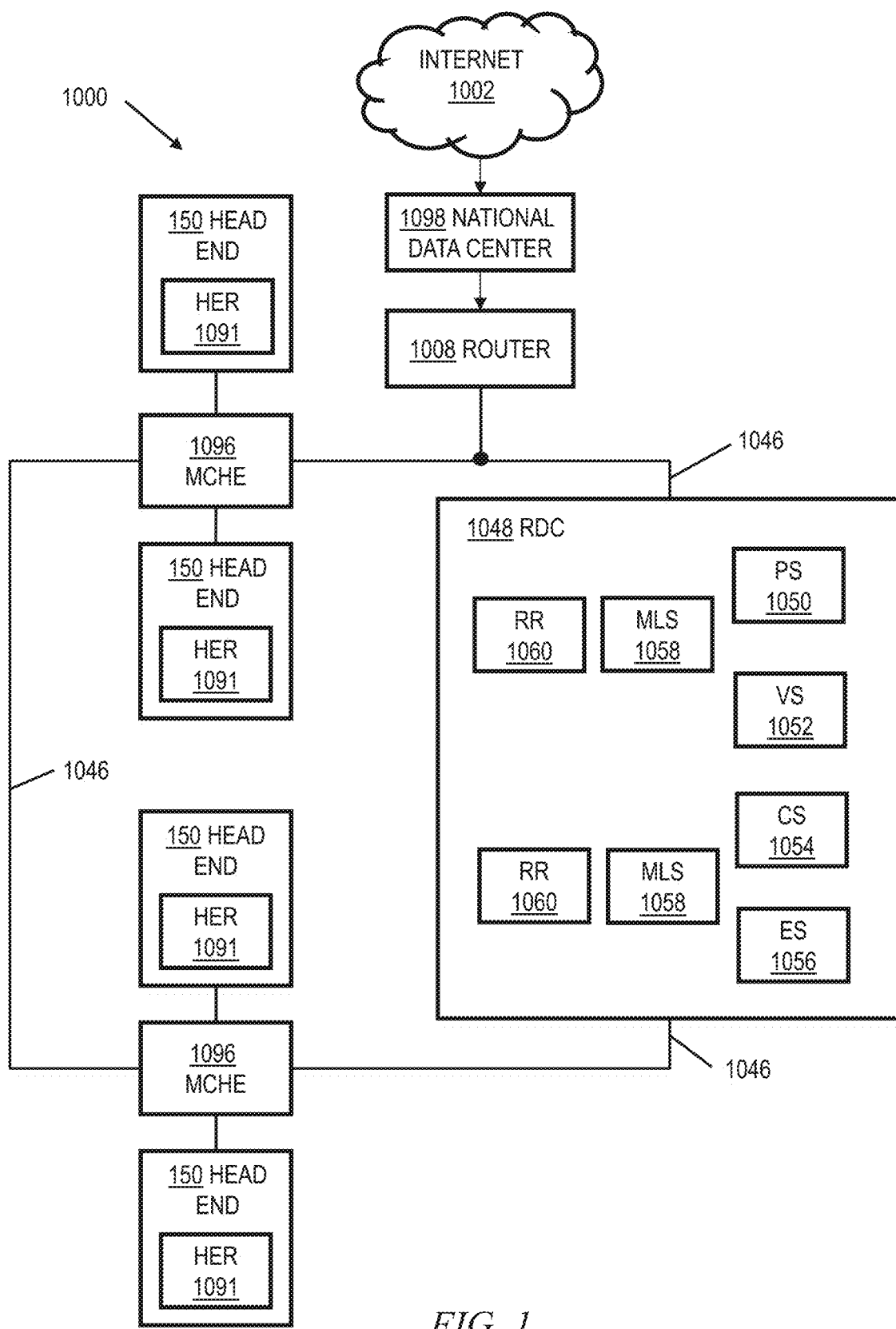
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
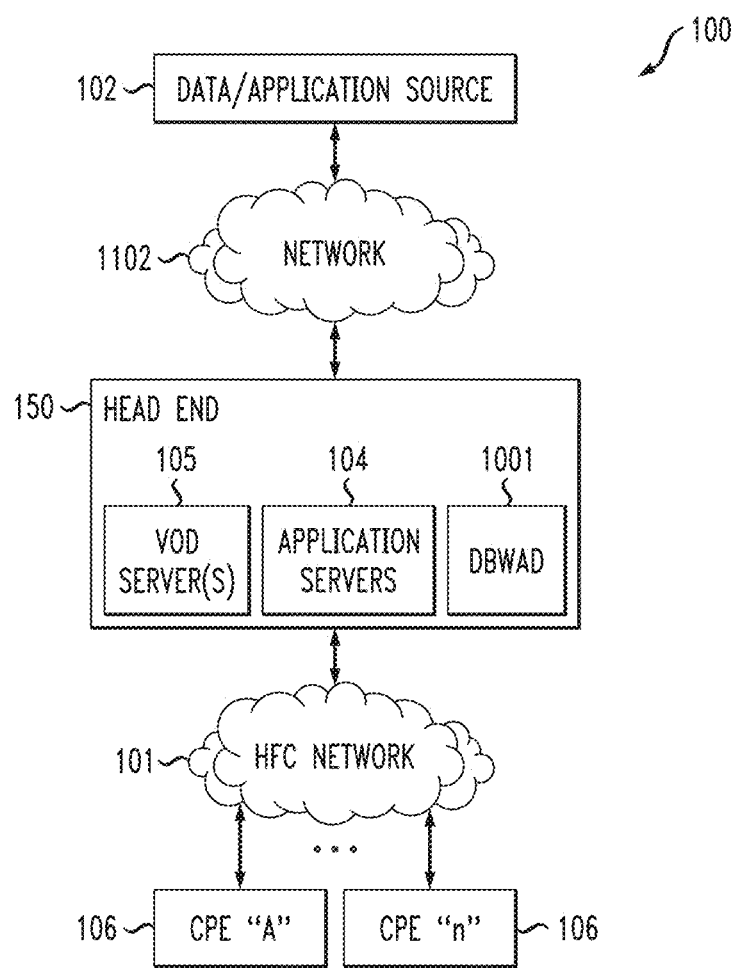
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. In one example embodiment, the CPE 106 serves as a platform for the expandable network device. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
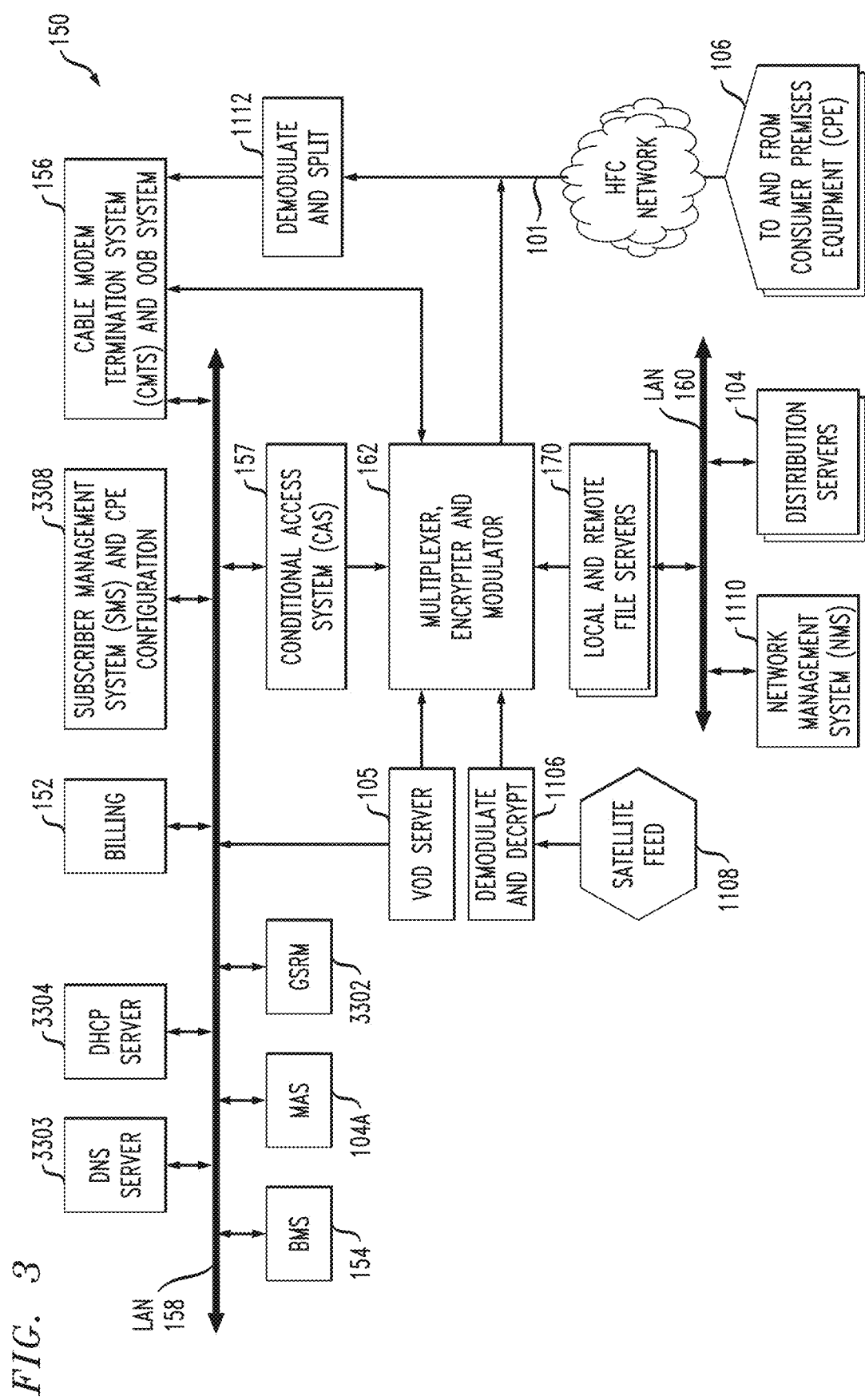
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville, Colo. 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
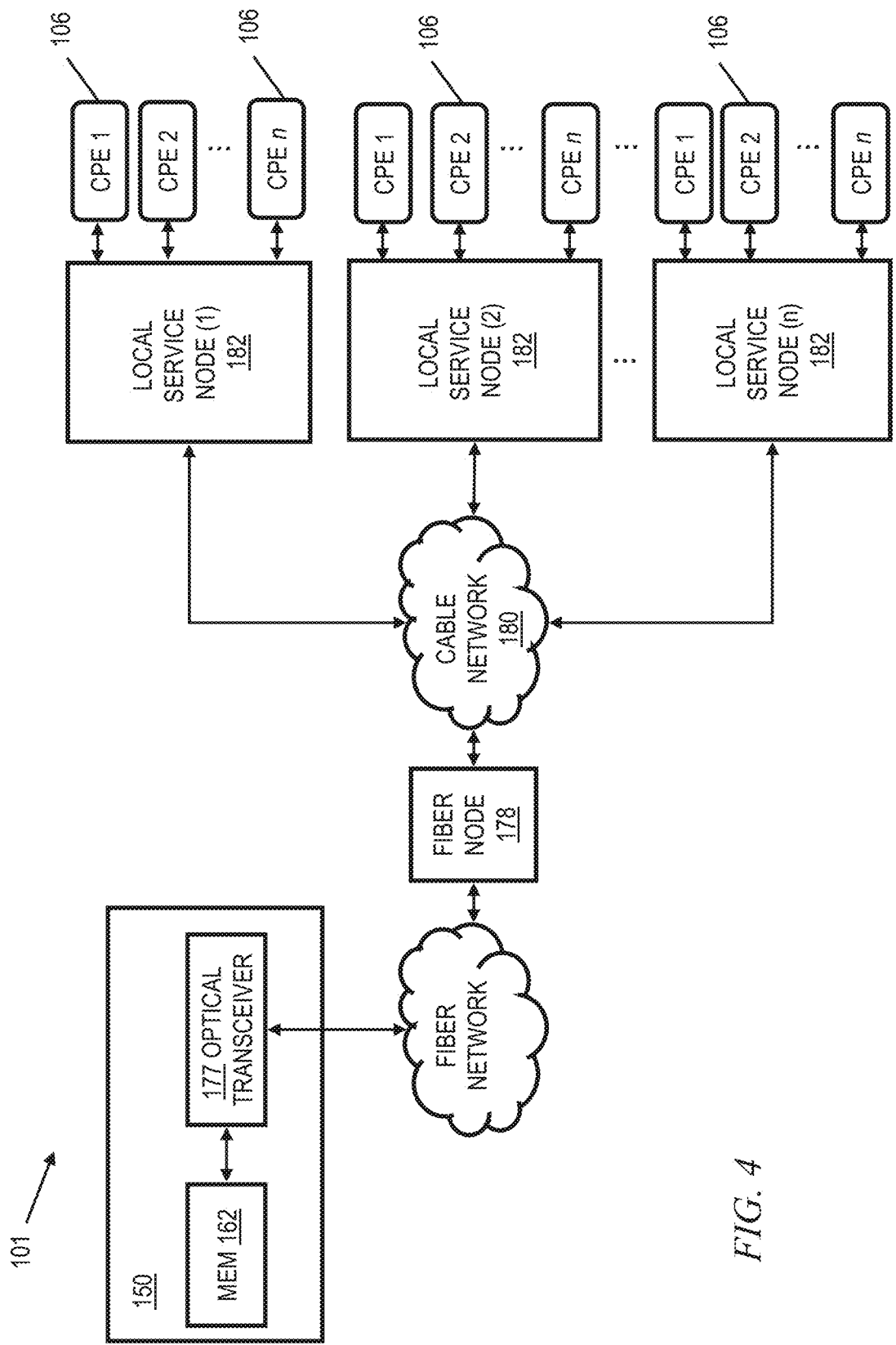
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
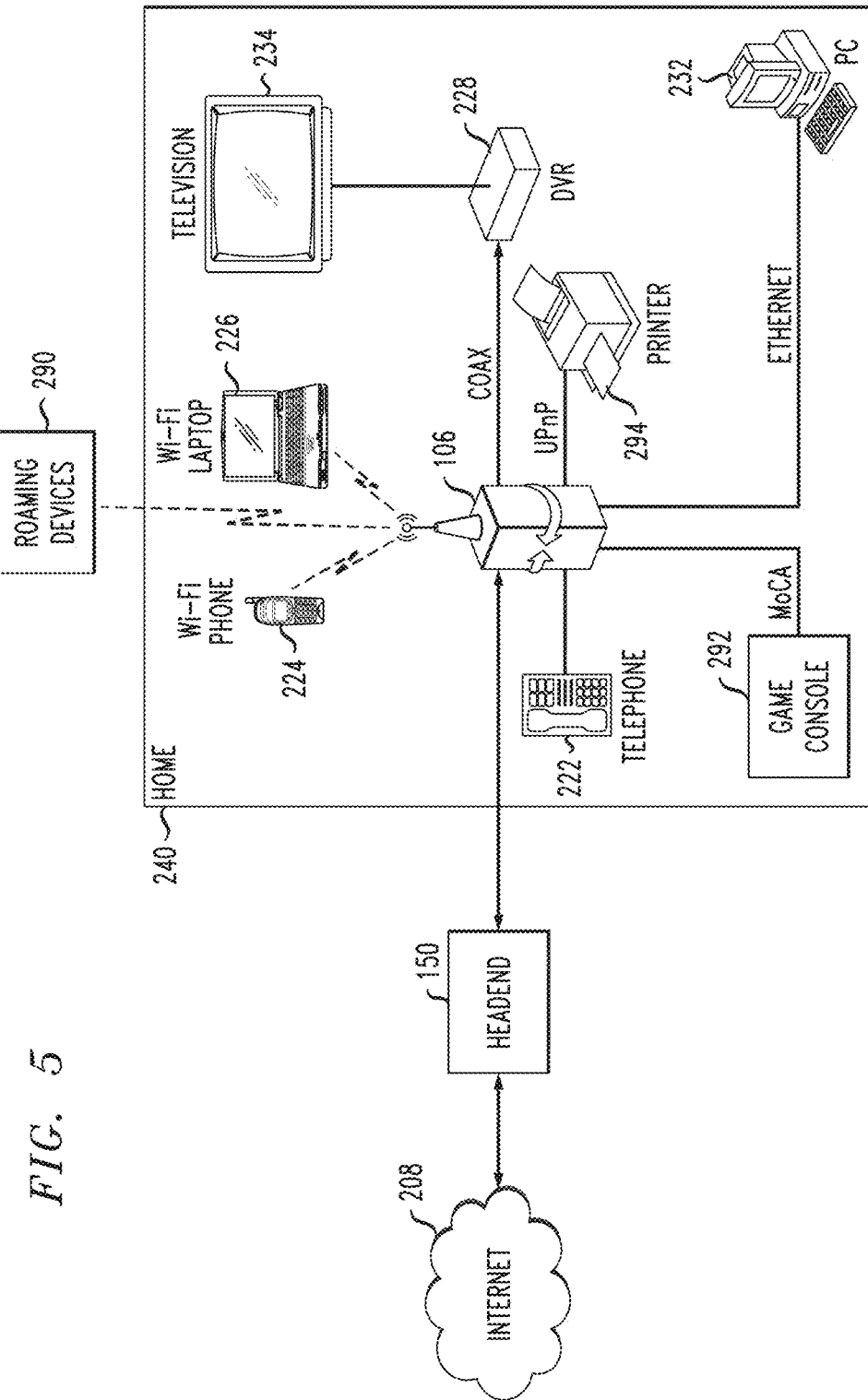
FIG. 5 is a functional block diagram of a premises network, including an exemplary centralized customer premises equipment (CPE) unit, interfacing with a head end such as that of FIG. 3.
Figure 6:
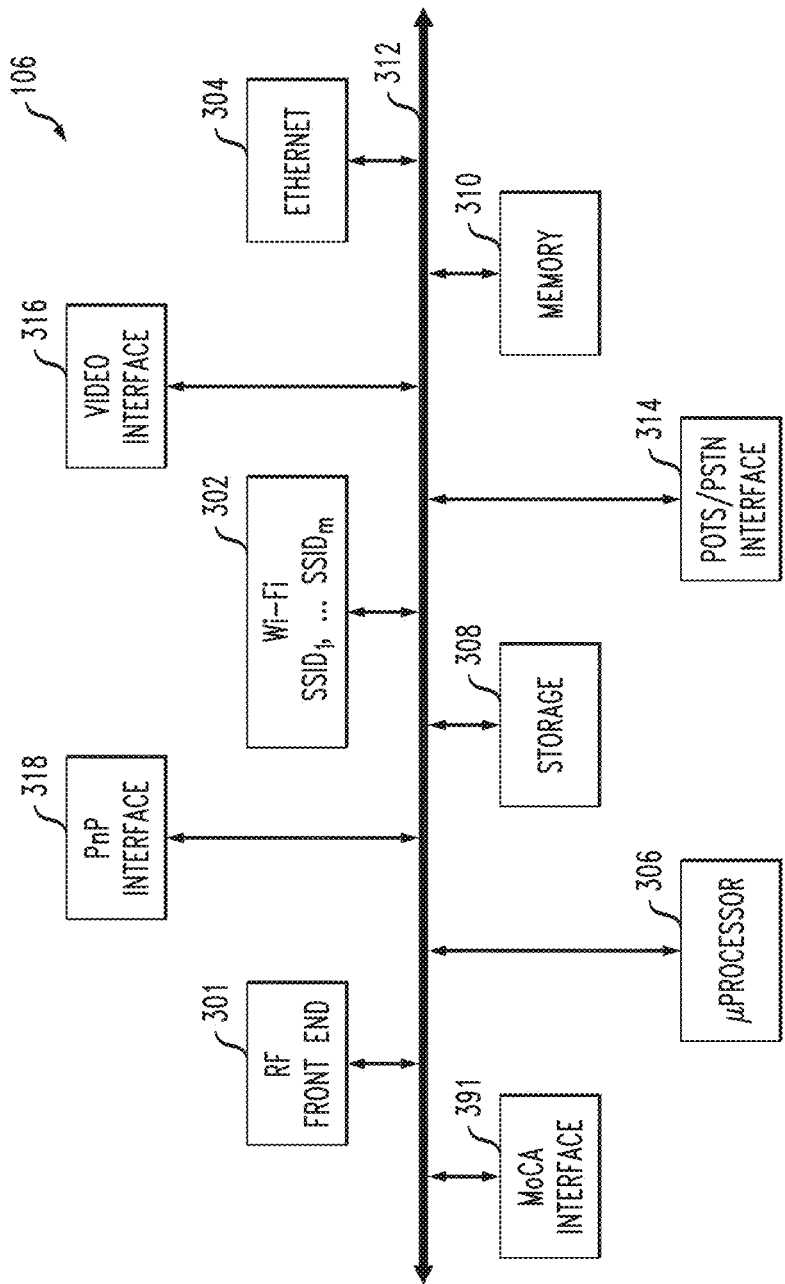
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, expandable network device, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
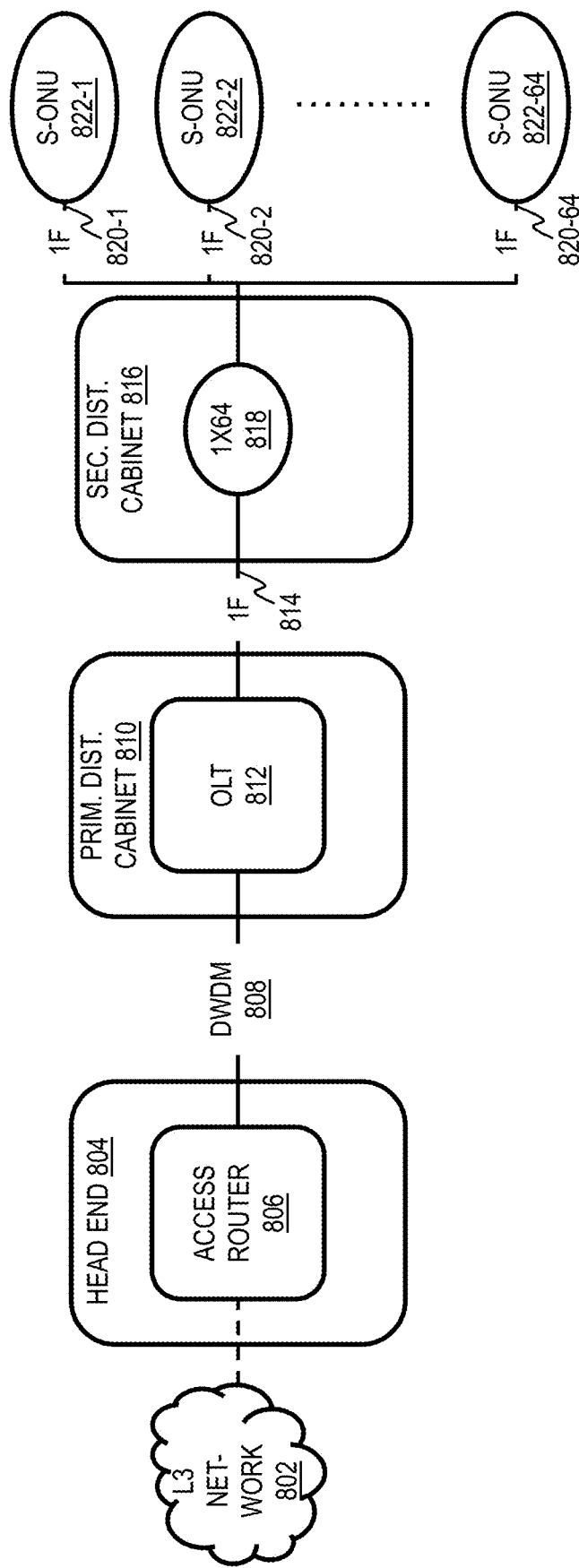
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
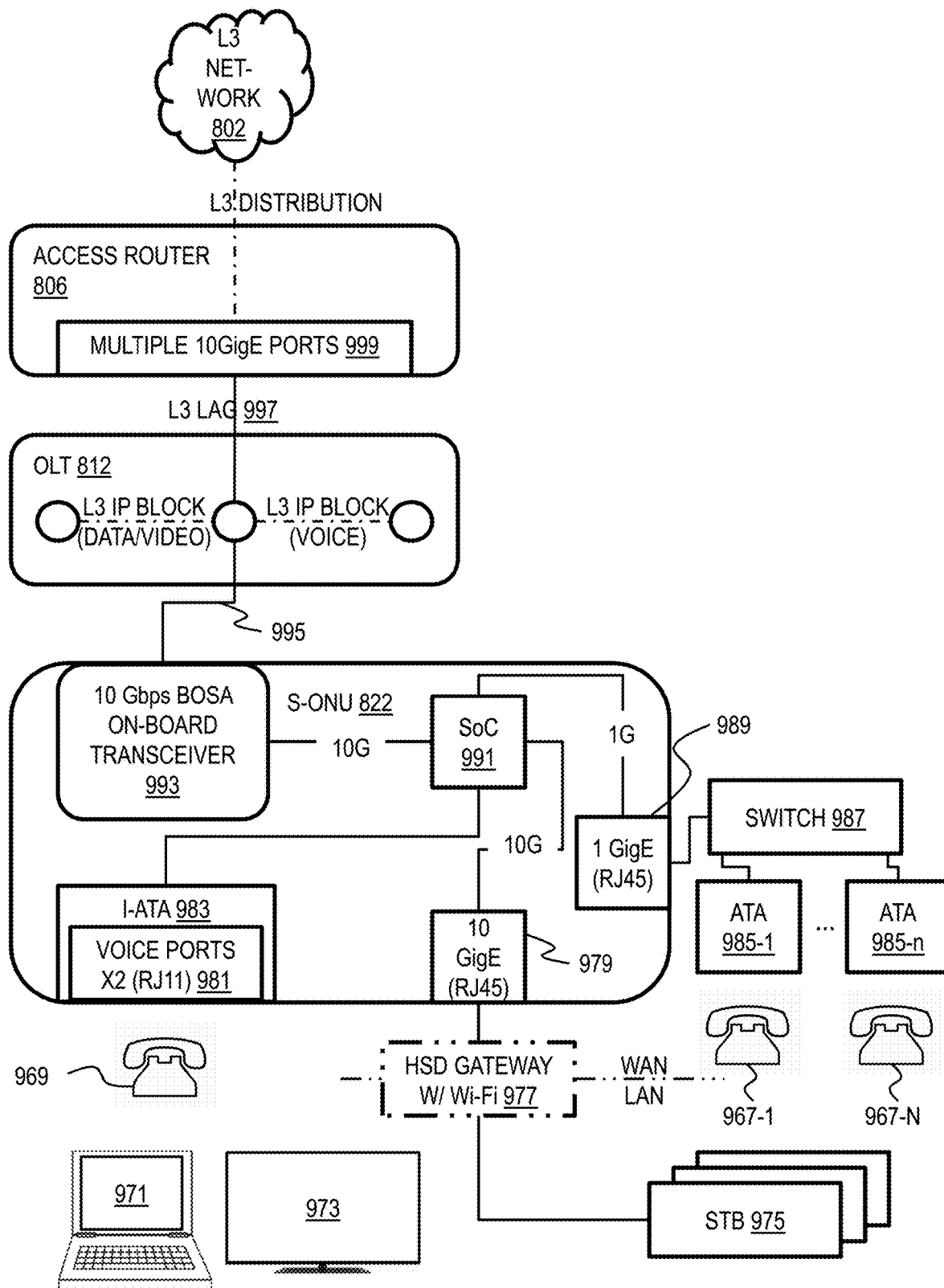
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Generally, a system and methods for integrating additional network interfaces into an expandable network device are disclosed. One or more embodiments enable a network interface, such as IEEE 802.15.4 (also known as ZigBee), IEEE 802.11 (also known as Wi-Fi), and IEEE 802.15.1 (also known as Bluetooth and BLE), to be operated by software interfaces and proxies (known as dynamic interfaces herein) integrated into the expandable network device post manufacturing (such as while deployed in a network environment). In one or more embodiments, the dynamic interfaces enable communications between the expandable network device and new products and devices, such as smart lighting, smart locks, garage door openers, sprinkler systems, security systems, appliances, home theater, cable boxes, network video recorders (NVRs), and the like. The disclosed techniques enable third-party developers and vendors, users of the expandable network device, and others to utilize the hardware infrastructure of the expandable network device to incorporate the dynamic interfaces into a deployed infrastructure and to enable the deployment of new products and devices that may otherwise require a network hub or similar device for communications and/or control. In one example embodiment, each dynamic interface is assigned its own IP address, enabling the dynamic interface to act as a virtual customer premises equipment (vCPE) device.

In one example embodiment, a section of the memory of the expandable network device is partitioned for use by the dynamic interfaces. (A defined section may be partitioned for each individual dynamic interface.) The partition is configured to provide protection from erroneous, unauthorized, or malicious activities by the dynamic interface using the underlying functionality of the expandable network device, and thus prevents these activities from adversely impacting the operation and performance of the expandable network device, or at least reduces the chances of such adverse impact.

In one example embodiment, a separate software container is utilized to partition memory on the expandable network device for use by the dynamic interfaces and/or applications utilizing dynamic interfaces (as used herein, a dynamic interface also refers to an application that utilizes a dynamic interface). Essentially, a dynamic interface container (also referred to as an IoT container herein) is installed on the expandable network device to allocate storage for installation of the dynamic interface on the expandable network device. In one or more instances, the dynamic interfaces are located in the network stack and serve as a bridge from the IoT applications to the home network. In one or more embodiments, the vendor specific applications that were installed on the device are located in the IoT container.

In a non-limiting example, each application is given its own IP address such that it is essentially acting as a virtual consumer premises equipment (vCPE).

In one example embodiment, the applications reside in the broadband RDK-B (Reference Design Kit for Broadband) stack in Cisco's Common Component Software Platform (CCSP) layer, each application essentially becoming its own container within the stack as a third party application or having its own container. Again, the RDK-B approach is exemplary and non-limiting and similar implementations could be made within other architectures.

The dynamic VPNs can be dynamic per se or they can be reserved and used dynamically, in which case they are just added into the IP route tables of the expandable network device. Regarding a dynamic VPN and/or other VPN, one or more embodiments provide a module that the application can call to set up a secure tunnel. The corresponding VPN module can then be placed in what are referred to as Gateway Apps in the RDK-B example.

In one example embodiment, a separate IoT container is created for each dynamic interface. The operating system of the expandable network device ensures that installed dynamic interfaces do not have write or read access to any container other than its own, thereby preventing snooping, data manipulations, or other erroneous or malicious activities.

In one example embodiment, the dynamic interfaces are capable of configuring, or requesting the configuration of, route tables and the like to direct specified network traffic to/from the devices (referred to as dynamic devices herein) connected via the dynamic interfaces. In one example embodiment, each application or dynamic interface utilizes the dynamic host configuration protocol (DHCP) to obtain an IP address and other network configuration parameters. The DHCP can be utilized by contacting a DHCP server in a local router, a dedicated DHCP server for dynamic interfaces, and the like.

In one example embodiment, two networks are served by the route table of the CPE 106: one for the IoT applications (such as those utilizing dynamic interfaces) and one for the conventional devices of the conventional home network. The router, for example, then advertises the routes to each routing domain. For example, in some instances, the expandable network device has one route table but the interfaces/applications/services install their routes into the main routing table. Therefore, all the services can know about themselves before being routed to the WAN interface. In one or more embodiments, the two networks (IoT and conventional) are configured to route to each other, but have separate broadcast domains. This allows an application to establish its own network (if needed for supporting IoT devices) and to separate customer data traffic for communication with IoT devices to be transported on its own LAN.

In one example embodiment, the dynamic interface is on its own LAN subnet and shares the WAN IP of the eRouter or CPE interface. For example, IoT gear could be assigned IP address 192.168.2.x and a regular internet data/User LAN could be assigned IP address 192.168.1.x. A number of implementation techniques can be used; for example, the code of the network stack can be rewritten, or a static route (adding a route entry into the route table) may be utilized, so that devices on the LAN know about the other network. As long as the application is advertising its network to the main routing table, other applications or services will typically know about the advertised application and each other via the routing table, so that a static route is not necessarily required in one or more embodiments. (It is noted that the skilled artisan in the field of coding network interfaces will be able to provide suitable modifications to the network stack given the teachings herein.)

In one example embodiment, the dynamic interfaces are capable of establishing, or requesting the establishment of, virtual private network (VPN) tunnels or other secure communication facilities between the dynamic devices and servers, such as content servers 1054 and distribution servers 104, or other devices. The servers may be provided and/or operated by an ISP, may be provided and/or operated by a third-party (in relation to the ISP and/or operator of the expandable network device), and the like. In one example embodiment, Hyper Text Transfer Protocol Secure (HTTPS), Generic Routing Encapsulation (GRE), Layer 3 virtual private network (L3 VPN), and the like are utilized to establish the VPN tunnels or other secure communication facilities.

Figure 10:
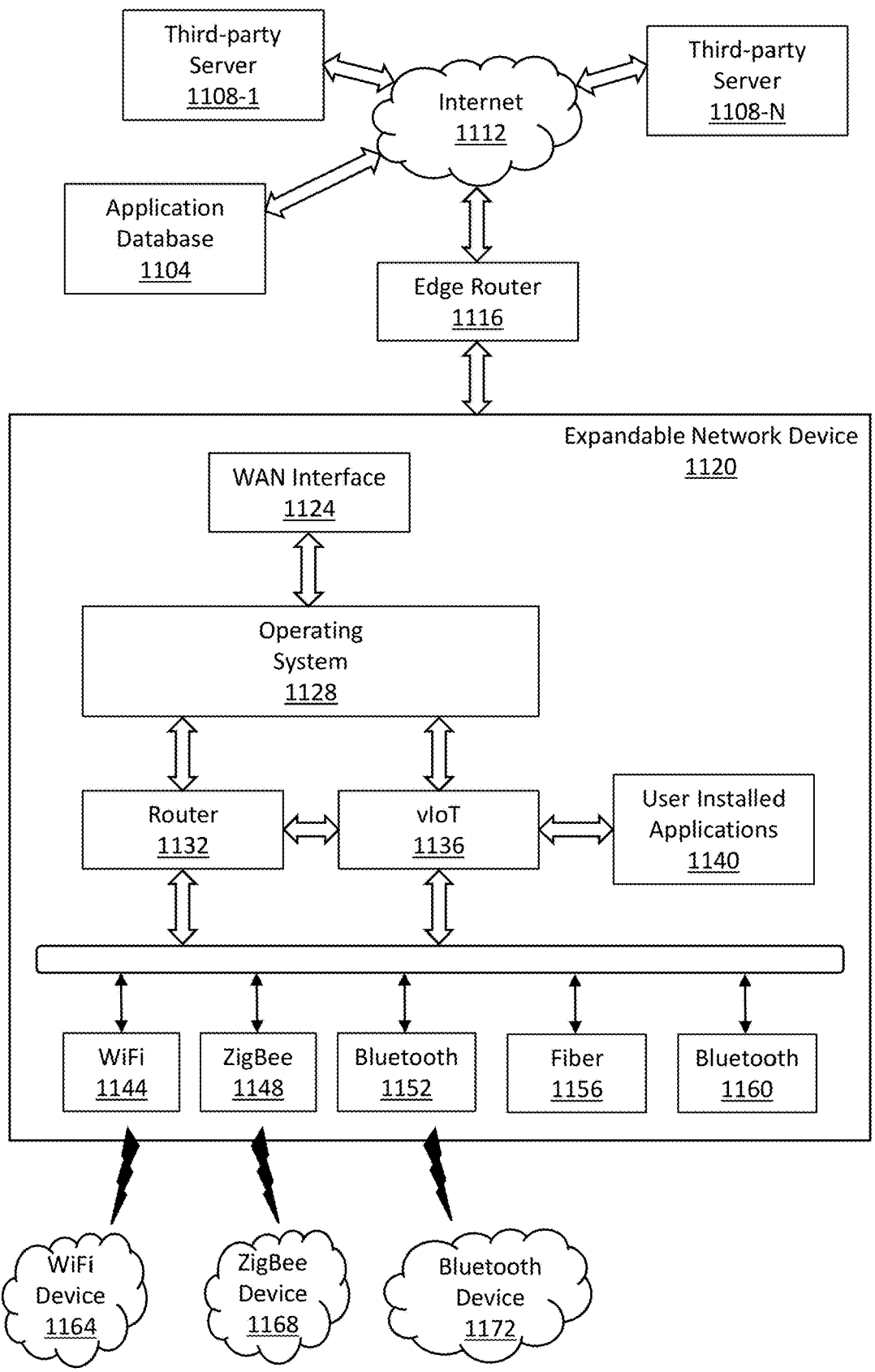
FIG. 10 is a block diagram of a system incorporating an example expandable network device, in accordance with an example embodiment.

Reference should now be had to FIGS. 10-13. FIG. 10 is a block diagram of a system incorporating an example expandable network device 1120, in accordance with an example embodiment. In one example embodiment, an application database 1104 stores dynamic interfaces, applications incorporating dynamic interfaces, and the like. The dynamic interfaces and applications are downloaded to, for example, the expandable network device 1120. In one example embodiment, the application database 1104 is a component of an application store ("app store"), such as an application store operated by an ISP. The applications and/or dynamic interfaces may be developed by the ISP, by third-party developers, and the like. The third-party developers may also provide third-party servers 1108-1, 1108-2 (seen in FIG. 12) . . . 1108-N (referred to collectively as third-party servers 1108 herein) to provide services via the Internet 1112 and the dynamic interfaces, as described more fully below in conjunction with FIGS. 11 and 12. An edge router 1116 routes network traffic between the Internet 1112 and the expandable network device 1120 via a WAN interface 1124.

In one example embodiment, the expandable network device 1120 incorporates a number of dynamic interfaces, such as a Wi-Fi™ interface 1144, a ZigBee interface 1148, and a Bluetooth interface 1152. Zigbee is an IEEE 802.15.4-based specification that defines a number of communication protocols and is designed primarily for low power, low data rate communication within a small area, such as within a personal area network. Communication is conducted via a digital radio to provide services and applications, such as home automation, medical data collection, and the like.

Wi-Fi™ refers to a group of radio technologies for implementing the IEEE 802.11 family of standards in a variety of wireless local area network devices. Devices, such as laptops, automobiles, smartphones, and the like can be easily connected to Ethernet devices, connected to each other via a wireless access point, and the like. Each wireless channel may be shared by a plurality of networks.

Bluetooth is a wireless technology based on the IEEE 802.15.1 standard for data communication between devices, both fixed and mobile, over short distances. Bluetooth uses short-wavelength, ultra-high frequency (UHF) radio waves and, as with Zigbee, can be used to construct personal area networks.

In one example embodiment, an operating system 1128 provides a platform for operation of the dynamic interfaces, such as user-installed applications 1140 which incorporate one or more dynamic interfaces. In one example embodiment, the operating system 1128 partitions and configures a separate software container for use by a dynamic interface. In one or more embodiments, operating system (OS) 1128 manages the virtual device(s)/interface(s) and its/their resources. These are generally interfaces within the firmware/OS of the devices that are used. Activities that are included in the management of the virtual device(s)/interface(s) and its/their resources include managing memory, CPU usage, storage, and quality of service (QoS), and the like. A router 1132 provides conventional routing functions within the END 1120. A non-limiting example of the router 1132 in the DOCSIS® environment is an eRouter. The skilled artisan will appreciate that other types of routers can be used in other environments. A vIoT 1136 provides a service that manages the establishment and operation of the dynamic interfaces on the END 1120, in addition to facilitating the establishment of communications between the dynamic interfaces and other components. The vIoT 1136 also manages, for example, the whitelists and blacklists that determine the network connections that are to be allowed, to be rejected, and the like. In one example embodiment, each IoT container is an element of the vIoT 1136. In one example embodiment, each IoT container is external to the vIoT 1136 and is an element of the User Installed Applications 1140. Elements 1156, 1160, 1164, 1168, and 1172 are described below.

Figure 11:
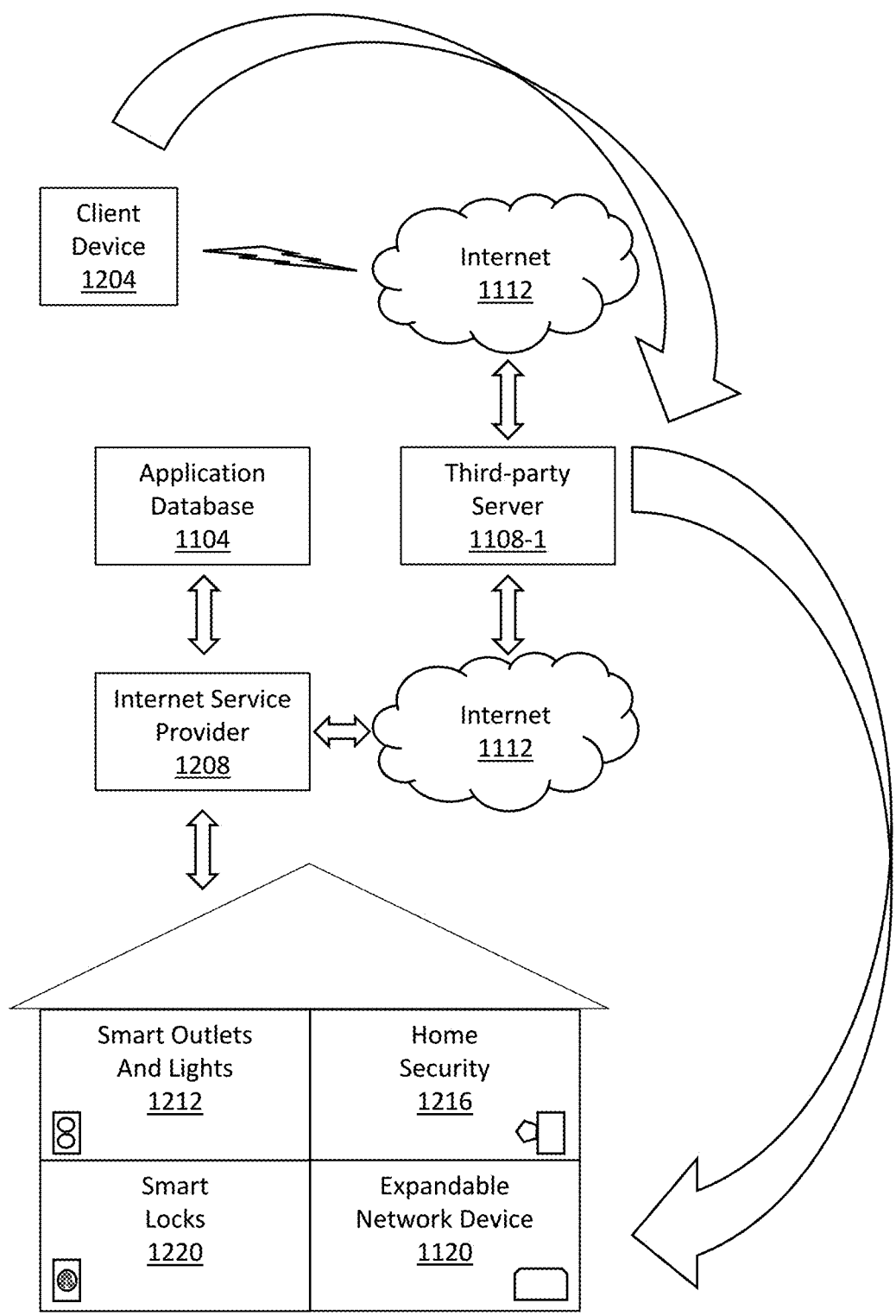
FIG. 11 illustrates the establishment of a virtual private network (VPN) tunnel or other secure communication facility between a client device, such as a smart phone, and a third-party server via the Internet and between the third-party server and the expandable network device, such as a smart router, via the Internet and an internet service provider, in accordance with an example embodiment.

FIG. 11 illustrates the establishment of a VPN tunnel or other secure communication facility between a client device 1204, such as a smart phone, and a third-party server 1108-1 via the Internet 1112 and between the third-party server 1108-1 and the expandable network device 1120, such as a smart router, via the Internet 1112 and an internet service provider 1208, in accordance with an example embodiment. A dynamic interface, such as the Wi-Fi interface 1144 for communicating with Wi-Fi device 1164, ZigBee interface 1148 for communicating with ZigBee device 1168, Bluetooth interfaces 1152, 1160 for communicating with Bluetooth device 1172, and fiber interface 1156, may be used to communicate and/or control a dynamic device 1232 (see FIG. 12), such as smart outlets and lights 1212, home security system 1216, smart locks 1220, and the like. For example, smart outlets and lights 1212 are turned on and off via a command from the client device 1204, smart locks 1220 are locked and unlocked via a command from the client device 1204, and the like.

Figure 12:
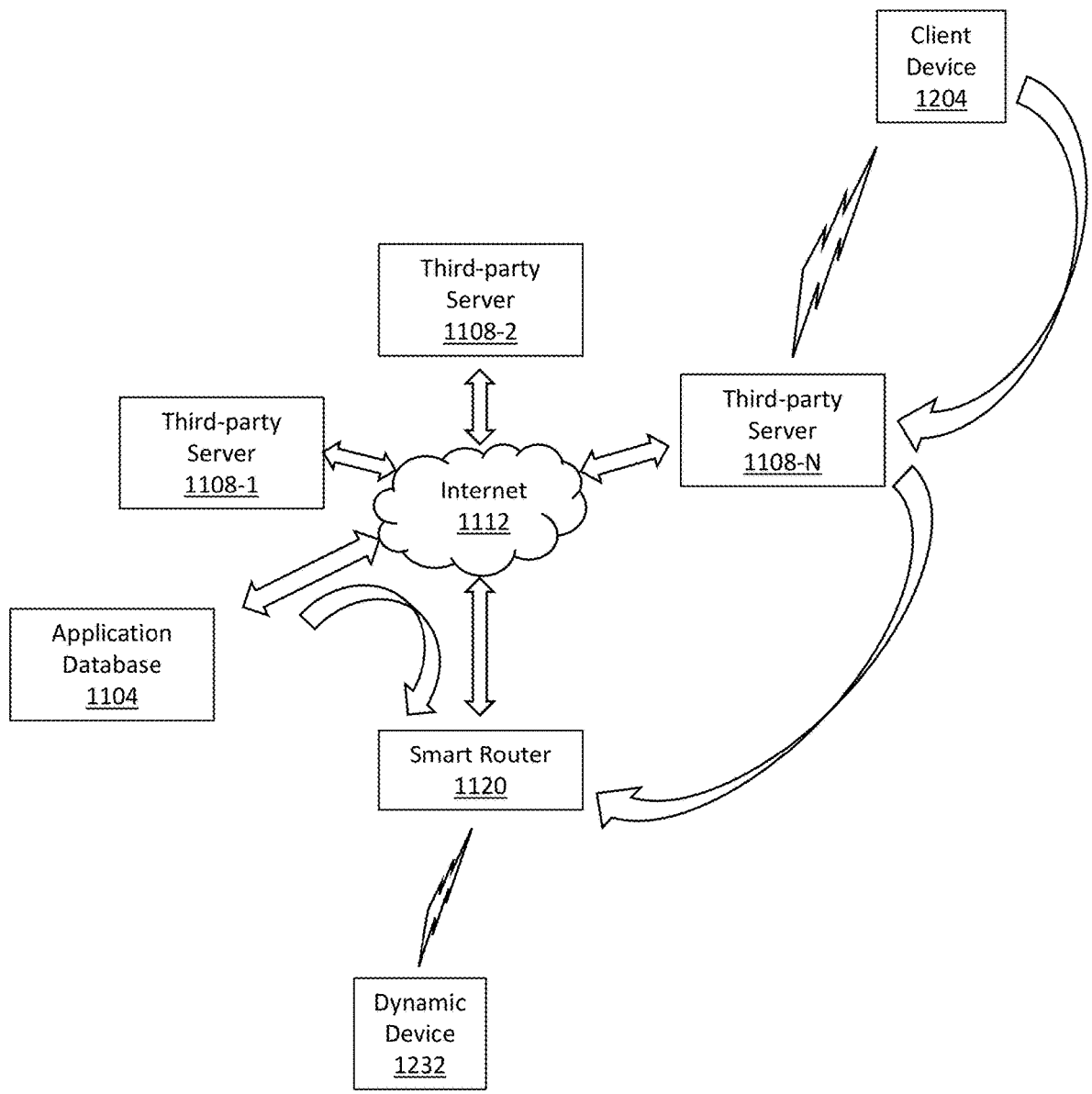
FIG. 12 illustrates the establishment of a dynamic interface on the expandable network device, in accordance with an example embodiment.

FIG. 12 illustrates the establishment of a dynamic interface on the expandable network device 1120 (e.g. a smart router—a smart router is a non-limiting example of the expandable network device 1120), in accordance with an example embodiment. In one example embodiment, a user uses a client device 1204, such as a smartphone, to search for, select, and download a dynamic interface and/or application that incorporates a dynamic interface from the application database 1104 into the expandable network device 1120. As described more fully above, the dynamic interface and/or application incorporating a dynamic interface is stored in a separate software IoT container on the expandable network device (END) 1120. Once established on the END 1120, the dynamic interface may be accessed by an authorized client device 1204 to communicate with and/or control a dynamic device 1232. In one example embodiment, secure tunnels are then established between the client device 1204 and the third-party server 1108-1 and between the third-party server 1108-1 and the END 1120. As noted above, each secure tunnel may be implemented using Hyper Text Transfer Protocol Secure (HTTPS), Generic Routing Encapsulation (GRE), Layer 3 virtual private network (L3 VPN), and the like.

Figure 13:
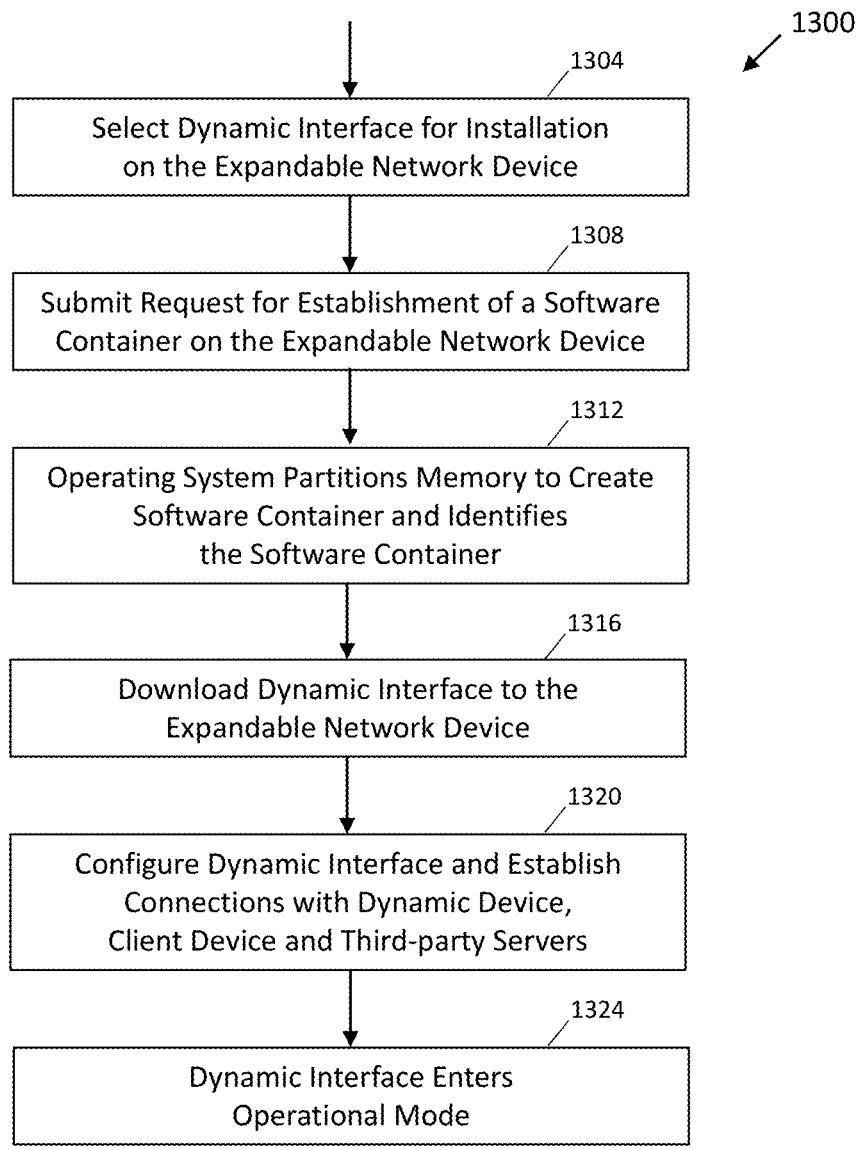
FIG. 13 is a flowchart of an example method for incorporating dynamic interfaces into the expandable network device, in accordance with an example embodiment.

FIG. 13 is a flowchart of an example method 1300 for incorporating dynamic interfaces into the expandable network device 1120, in accordance with an example embodiment. In one example embodiment, a dynamic interface is selected for installation on the expandable network device 1120 (operation 1304). A request for the establishment of a software IoT container or other type of partition of the memory of the expandable network device 1120 is submitted to the expandable network device 1120 (operation 1308). In response, the operating system 1128 partitions the memory of the expandable network device 1120 and identifies the software IoT container to be used for the selected dynamic interface or application (operation 1312). The selected dynamic interface or application is downloaded from, for example, the application database 1104 into the identified software IoT container (operation 1316). The selected dynamic interface performs a self-configuration procedure, establishing a connection with the appropriate interface, such as the Wi-Fi interface 1144, ZigBee interface 1148, or Bluetooth interface 1152, and establishes a connection with the dynamic device 1232, client device 1204, third-party server(s) 1108, or any combination thereof (operation 1320). The selected dynamic interface then enters operational mode (operation 1324). In one example embodiment, a communication channel is established between a network interface of the expandable network device 1120 (such as the WAN interface 1124) and a hardware interface of the expandable network device 1120 (such as the Wi-Fi interface 1144) via the dynamic interface. For example, the selected dynamic interface or application may begin monitoring and/or controlling a smart residential thermostat or other device such as, for example, those disclosed herein. For example, a premises heating and/or cooling system can then be controlled and operated via the thermostat.

Figure 14:
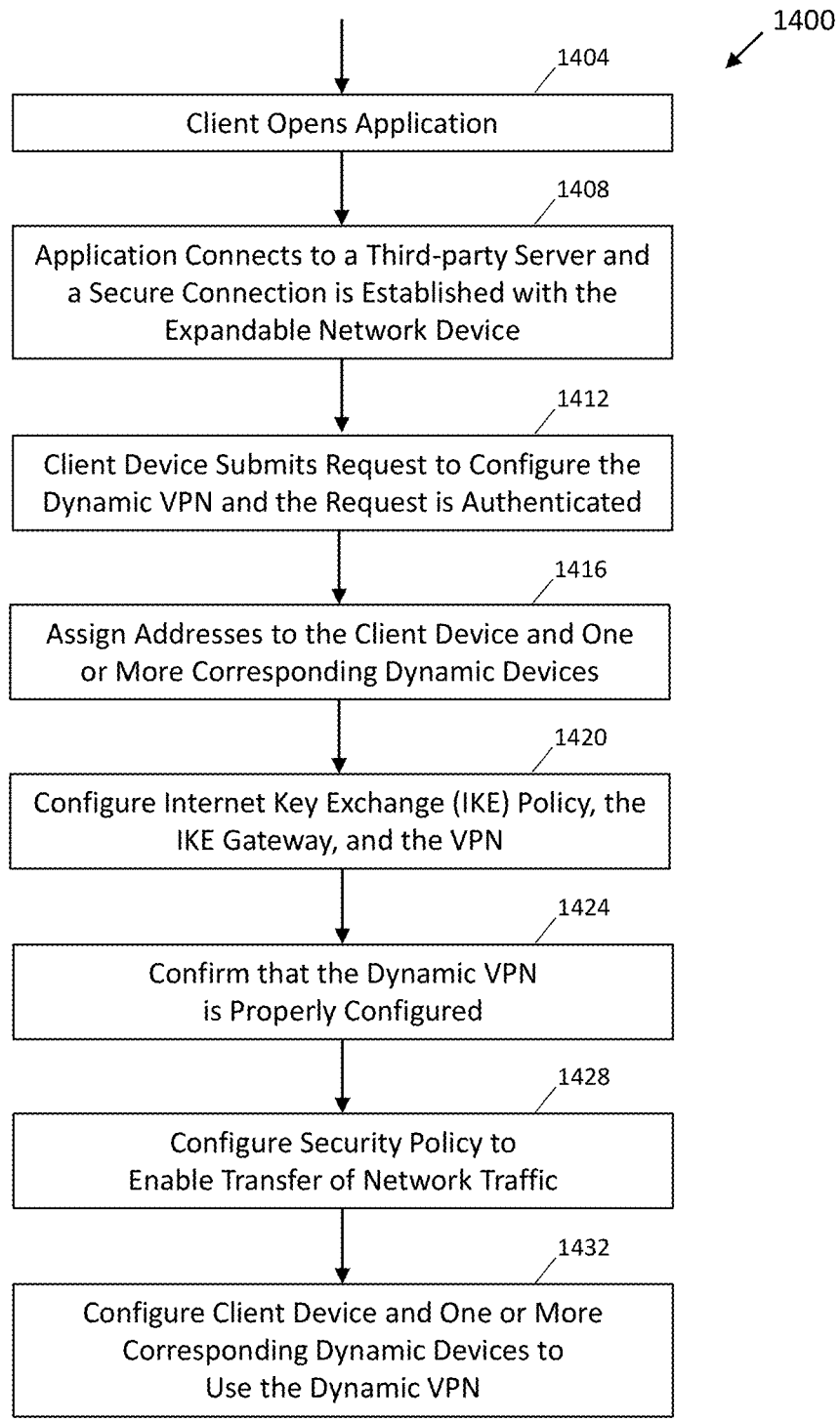
FIG. 14 is a flowchart of an example method for establishing and providing communications between a dynamic interface in the expandable network device and a dynamic device, in accordance with an example embodiment.

FIG. 14 is a flowchart of an example method 1400 for establishing and providing communications between a dynamic interface in the expandable network device 1120 and a dynamic device 1232, in accordance with an example embodiment. In one example embodiment, communications are established using HTTPS or standard protocols, such as Network Working Group RFC4555 and RFC5265. In one example embodiment, the client device 1204 opens an application, such as one of the user-installed applications 1140 (operation 1404), and the application connects to one of the third-party servers 1108 by starting, for example, a VPN, L2VPN, HTTPS, or GRE connection (operation 1408). A secure connection is established with the expandable network device 1120. Once both connections are established, commands or other communications (such as monitoring communications) can be exchanged with the dynamic device 1232.

In one example embodiment, the client device 1204 submits a request to configure the dynamic VPN and the request is authenticated (operation 1412). Addresses are assigned to the client device 1204 and the dynamic device 1232 (operation 1416). The internet key exchange (IKE) policy, the IKE gateway, and the VPN are configured (operation 1420). In one example embodiment, a configuration check is performed to confirm that the dynamic VPN is properly configured (operation 1424). A security policy is configured to enable the transfer of network traffic from the client device 1204 to the IKE gateway (operation 1428). Note that in one or more embodiments, host inbound traffic should be configured to allow specific traffic to reach the device from systems that are connected to its interfaces (for example, IKE and HTTPS traffic should be allowed.)

The preceding example is exemplary and non-limiting. For example, one or more embodiments employ a dynamic multipoint VPN which bypasses the third party servers 1108.

One or more embodiments make the third party server 1108 and/or the expandable network device 1120 the Next Hop Resolution Protocol (NHRP) server, and the user's client device 1204 and/or third party server 1108 the NHRP clients. In some instances, the client portion configuration is built into the third party applications. Given the teachings herein, the skilled artisan will appreciate that there are a variety of possible techniques to create a dynamic VPN back to the expandable network device. Some embodiments include incorporating the VPN functionality into the third party IoT application that the user installs on the user's mobile device (s) or client device 1204. The expandable network device 1120 can also have a VPN service built in as well. The client device 1204 and dynamic device(s) 1232 are configured to use the dynamic VPN (operation 1432). In one example embodiment; an application auto-triggers the VPN connection. In one example embodiment, split tunneling is configured by, for example, the third-party servers 1108 and is used to only send IoT traffic through the VPN tunnel. In one example embodiment, the third-party servers 1108 are bypassed and a secure tunnel is established directly from the client device 1204 to the expandable network device 1120.

Given the discussion thus far, it will be appreciated that, an exemplary method for incorporating a dynamic interface into an expandable network device 1120 comprises the operations of partitioning a section of memory of the expandable network device 1120 for the dynamic interface (operation 1312); loading the dynamic interface into the partitioned section of the memory (operation 1316); configuring a hardware interface of the expandable network device 1120 to communicate with the dynamic interface under a control of the dynamic interface (operation 1320); and establishing a communication channel between a network interface of the expandable network device 1120 and the hardware interface of the expandable network device 1120 via the dynamic interface (operation 1324).

In one example embodiment, the dynamic interface is assigned its own Internet Protocol (IP) address to enable the dynamic interface to act as a virtual customer premises equipment (vCPE) device. In one example embodiment, the partitioning further comprises creating an Internet-of-Things (IoT) container on the expandable network device 1120 to allocate storage for installation of the dynamic interface on the expandable network device 1120. In one example embodiment, the dynamic interface utilizes a dynamic host configuration protocol (DHCP) to obtain an Internet Protocol (IP) address and other network configuration parameters. In one example embodiment, the dynamic host configuration protocol (DHCP) is utilized by contacting a dynamic host configuration protocol (DHCP) server in a local router or a dynamic host configuration protocol (DHCP) server dedicated for dynamic interfaces.

In one example embodiment, a route table in the expandable network device 1120 is configured to serve a first network and a second network, the first network being configured to provide communications for the dynamic interface and the second network being configured to provide communications for other devices. In one example embodiment, one or more secure tunnels are established between a client device 1204 and a third-party server 1108 and between the third-party server 1108 and the expandable network device 1120. In one example embodiment, one or more secure tunnels are established between a client device 1204 and the expandable network device 1120.

In one example embodiment, an expandable network device 1120 comprises a memory; and at least one processor coupled to said memory; wherein said expandable network device 1120 is configured to perform operations comprising partitioning a section of memory of the expandable network device 1120 for the dynamic interface (operation 1312); loading the dynamic interface into the partitioned section of the memory (operation 1316); configuring a hardware interface of the expandable network device 1120 to communicate with the dynamic interface under a control of the dynamic interface (operation 1320); and establishing a communication channel between a network interface of the expandable network device 1120 and the hardware interface of the expandable network device 1120 via the dynamic interface (operation 1324).

In one example embodiment, a non-transitory computer readable medium comprises computer executable instructions which when executed by a computer cause the computer to perform operations comprising partitioning a section of memory of the expandable network device 1120 for the dynamic interface (operation 1312); loading the dynamic interface into the partitioned section of the memory (operation 1316); configuring a hardware interface of the expandable network device 1120 to communicate with the dynamic interface under a control of the dynamic interface (operation 1320); and establishing a communication channel between a network interface of the expandable network device 1120 and the hardware interface of the expandable network device 1120 via the dynamic interface (operation 1324).

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
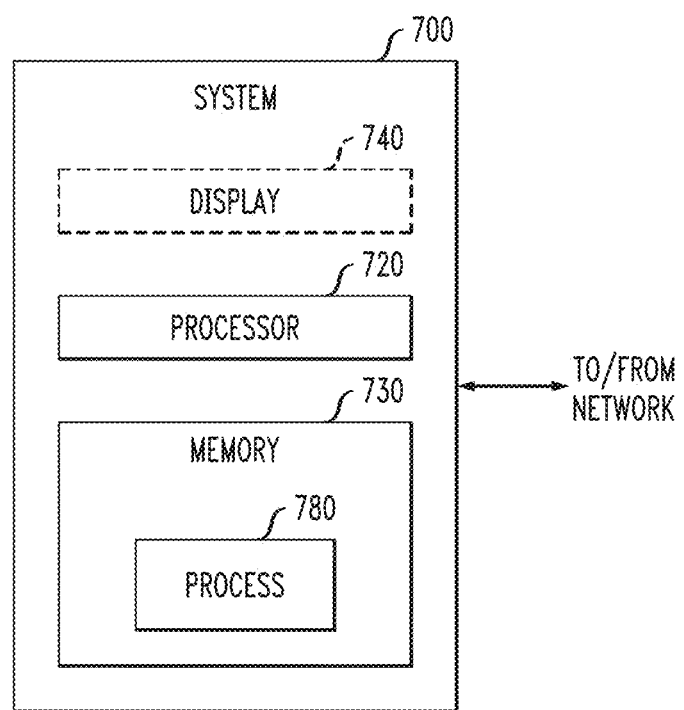
FIG. 7 is a block diagram of a computer system useful in connection with one or more aspects of the invention.

FIG. 7 is a block diagram of a system 700 that can implement at least some aspects of the invention, and is representative, for example, of the managed router services device 1224 and/or one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiberoptics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a managed router services device 1224; a virtualized or non-virtualized hardware server implementing, or the like, and that such program may be embodied on a tangible computer readable recordable storage medium. A program can also run on a processor 306 of CPE 106. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement the components in FIG. 12). The method steps can then be carried out using the distinct software modules of the system, as described above, executing on one or more hardware processors (e.g., one or more hardware processors of managed router services device 1224; DPI device 1208; and/or other depicted components). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for incorporating a dynamic interface into an expandable network device, comprising the operations of:
    partitioning a section of memory of the expandable network device for the dynamic interface;
    loading a software component of the dynamic interface into the partitioned section of the memory;
    configuring a hardware interface of the expandable network device to communicate with the dynamic interface under a control of the software component of the dynamic interface, wherein the software component facilitates communication between the expandable network device and an external device via the dynamic interface using an assigned Internet Protocol (IP) address; and
    establishing a communication channel between a network interface of the expandable network device and the hardware interface of the expandable network device via the dynamic interface.

2. The method of claim 1, wherein the expandable network device is part of a deployed infrastructure during performance of the method.

3. The method of claim 1, further comprising assigning the dynamic interface its own Internet Protocol (IP) address to enable the dynamic interface to act as a virtual customer premises equipment (vCPE) device.

4. The method of claim 1, wherein the partitioning further comprises creating an Internet-of-Things (IoT) container on the expandable network device to allocate storage for installation of the dynamic interface on the expandable network device.

5. The method of claim 1, wherein the dynamic interface utilizes a dynamic host configuration protocol (DHCP) to obtain the Internet Protocol (IP) address and other network configuration parameters.

6. The method of claim 5, wherein dynamic host configuration protocol (DHCP) is utilized by contacting a dynamic host configuration protocol (DHCP) server in a local router or a dynamic host configuration protocol (DHCP) server dedicated for dynamic interfaces.

7. The method of claim 1, further comprising configuring a route table in the expandable network device to serve a first network and a second network, the first network being configured to provide communications for the dynamic interface and the second network being configured to provide communications for other devices.

8. The method of claim 1, wherein the dynamic interface establishes a virtual private network (VPN) between a dynamic device and a server.

9. The method of claim 1, further comprising establishing one or more secure tunnels between a client device and a third-party server and between the third-party server and the expandable network device.

10. The method of claim 1, further comprising establishing one or more secure tunnels between a client device and the expandable network device.

11. The method of claim 1, further comprising establishing one or more secure tunnels between a client device and a dynamic device.

12. An expandable network device comprising:
a memory; and
at least one processor coupled to said memory;
wherein said expandable network device is configured to perform operations comprising:
partitioning a section of memory of the expandable network device for the dynamic interface;
loading a software component of the dynamic interface into the partitioned section of the memory;
configuring a hardware interface of the expandable network device to communicate with the dynamic interface under a control of the software component of the dynamic interface, wherein the software component facilitates communication between the expandable network device and an external device via the dynamic interface using an assigned Internet Protocol (IP) address; and
establishing a communication channel between a network interface of the expandable network device and the hardware interface of the expandable network device via the dynamic interface.

13. The expandable network device of claim 12, the operations further comprising assigning the dynamic interface its own Internet Protocol (IP) address to enable the dynamic interface to act as a virtual customer premises equipment (vCPE) device.

14. The expandable network device of claim 12, wherein the partitioning further comprises creating an Internet-of-Things (IoT) container on the expandable network device to allocate storage for installation of the dynamic interface on the expandable network device.

15. The expandable network device of claim 12, wherein the dynamic interface utilizes a dynamic host configuration protocol (DHCP) to obtain the Internet Protocol (IP) address and other network configuration parameters.

16. The expandable network device of claim 15, wherein dynamic host configuration protocol (DHCP) is utilized by contacting a dynamic host configuration protocol (DHCP) server in a local router or a dynamic host configuration protocol (DHCP) server dedicated for dynamic interfaces.

17. The expandable network device of claim 12, the operations further comprising configuring a route table in the expandable network device to serve a first network and a second network, the first network being configured to provide communications for the dynamic interface and the second network being configured to provide communications for other devices.

18. The expandable network device of claim 12, the operations comprising establishing one or more secure tunnels between a client device and a third-party server and between the third-party server and the expandable network device.

19. The expandable network device of claim 12, the operations further comprising establishing one or more secure tunnels between a client device and the expandable network device.

20. A non-transitory computer readable medium comprising computer executable instructions which when executed by a computer cause the computer to perform operations comprising:
partitioning a section of memory of the expandable network device for the dynamic interface;
loading a software component of the dynamic interface into the partitioned section of the memory;
configuring a hardware interface of the expandable network device to communicate with the dynamic interface under a control of the software component of the dynamic interface, wherein the software component facilitates communication between the expandable network device and an external device via the dynamic interface using an assigned Internet Protocol (IP) address; and
establishing a communication channel between a network interface of the expandable network device and the hardware interface of the expandable network device via the dynamic interface.

\* \* \* \* \*